United States Patent
Yashiro et al.

(10) Patent No.: US 9,076,324 B2
(45) Date of Patent: Jul. 7, 2015

(54) REMOTE CONTROL SYSTEM FOR IN-VEHICLE DEVICE

(71) Applicant: MITSUBISHI JIDOSHA KOGYO KABUSHIKI KAISHA, Tokyo (JP)

(72) Inventors: Hiroyuki Yashiro, Tokyo (JP); Naoki Kawashima, Tokyo (JP); Hiroki Fukatsu, Tokyo (JP); Takuma Maeda, Tokyo (JP); Masahide Shiba, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/021,124

(22) Filed: Sep. 9, 2013

(65) Prior Publication Data

US 2014/0088794 A1    Mar. 27, 2014

(30) Foreign Application Priority Data

Sep. 27, 2012  (JP) ................................ 2012-214707

(51) Int. Cl.
G07C 1/00 (2006.01)
G08C 17/00 (2006.01)
G08C 17/02 (2006.01)
H04W 52/02 (2009.01)
H04M 1/725 (2006.01)

(52) U.S. Cl.
CPC .............. *G08C 17/00* (2013.01); *Y10S 903/903* (2013.01); *G08C 17/02* (2013.01); *H04W 52/0216* (2013.01); *G08C 2201/12* (2013.01); *G08C 2201/93* (2013.01); *H04M 1/72533* (2013.01)

(58) Field of Classification Search
None
See application file for complete search history.

(56) References Cited

U.S. PATENT DOCUMENTS

| | | | |
|---|---|---|---|
| 6,740,738 B2* | 5/2004 | Einat et al. | 530/388.24 |
| 7,245,631 B2* | 7/2007 | Sano et al. | 370/463 |
| 8,005,453 B2* | 8/2011 | Van Bosch et al. | 455/343.2 |
| 8,429,435 B1* | 4/2013 | Clayton et al. | 713/320 |
| 8,737,280 B2* | 5/2014 | Mujtaba et al. | 370/311 |
| 2002/0173289 A1* | 11/2002 | Pacsai et al. | 455/343 |
| 2003/0150416 A1 | 8/2003 | Flick | |
| 2007/0037610 A1 | 2/2007 | Logan | |

(Continued)

FOREIGN PATENT DOCUMENTS

JP      11-230013  A      8/1999

OTHER PUBLICATIONS

European Search Report mailed Jan. 7, 2014 for corresponding European Patent Application No. 13182455.9.

*Primary Examiner* — John R Olszewski
*Assistant Examiner* — James M McPherson
(74) *Attorney, Agent, or Firm* — Birch, Stewart, Kolasch & Birch, LLP

(57) ABSTRACT

A remote control system includes an in-vehicle controller that is installed in a vehicle and controls in-vehicle devices installed in the vehicle; a mobile communication device that remotely controls the in-vehicle devices via the in-vehicle controller; and a wireless communication device that is installed in the vehicle and intervenes and establishes wireless communication between the in-vehicle controller and the mobile communication device, wherein the wireless communication device includes a reception-mode switching unit that switches between a reception standby mode with consumption of a standby current to prepare for reception from the mobile communication device and a reception dormant mode without consumption of a standby current in accordance with a time schedule.

8 Claims, 13 Drawing Sheets

(56) References Cited

U.S. PATENT DOCUMENTS

2009/0077405 A1  3/2009  Johansen
2014/0045482 A1*  2/2014  Bisson et al. .................. 455/420
2014/0066132 A1*  3/2014  Burke et al. ............... 455/569.2

* cited by examiner

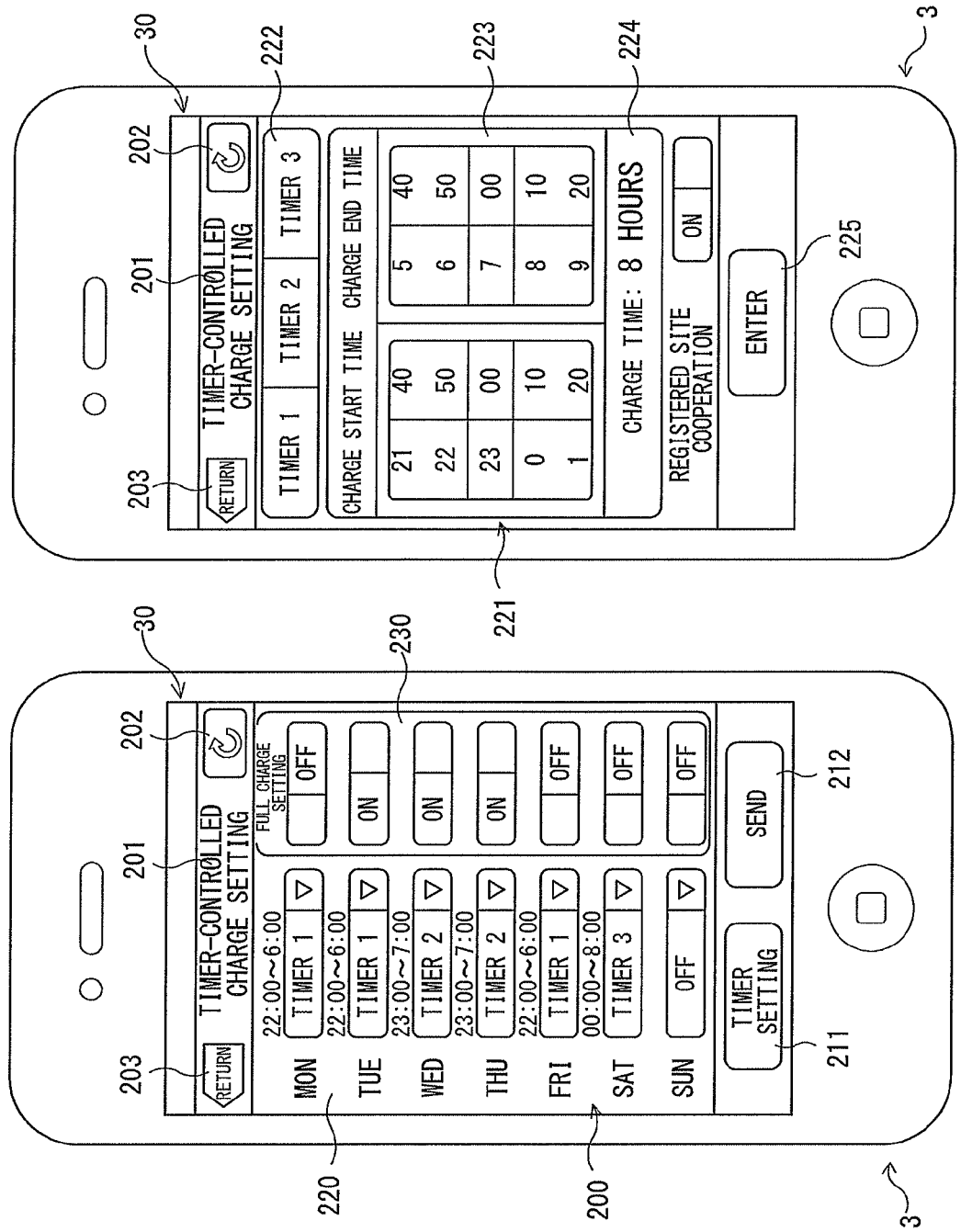

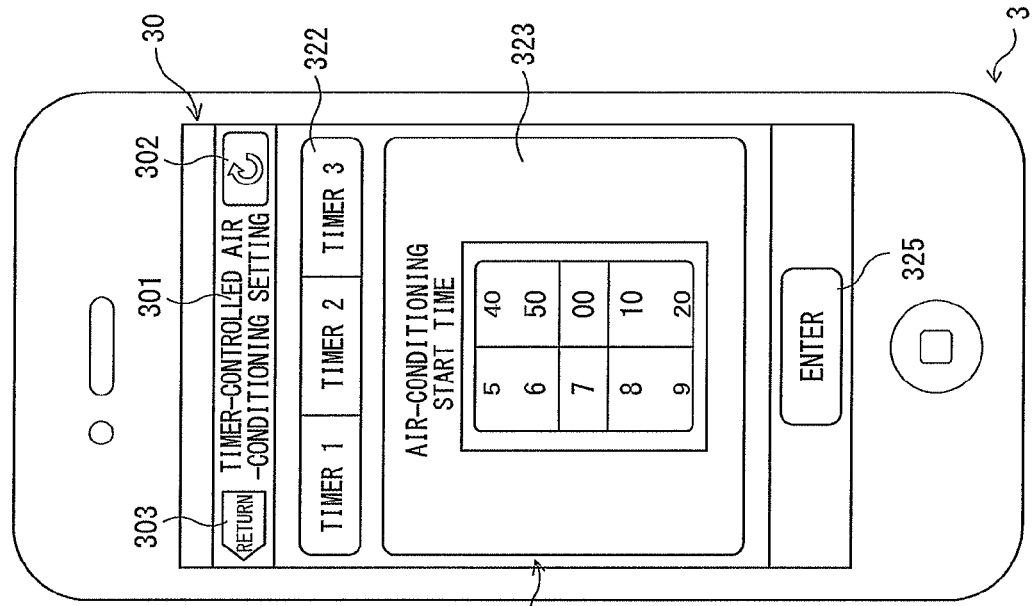
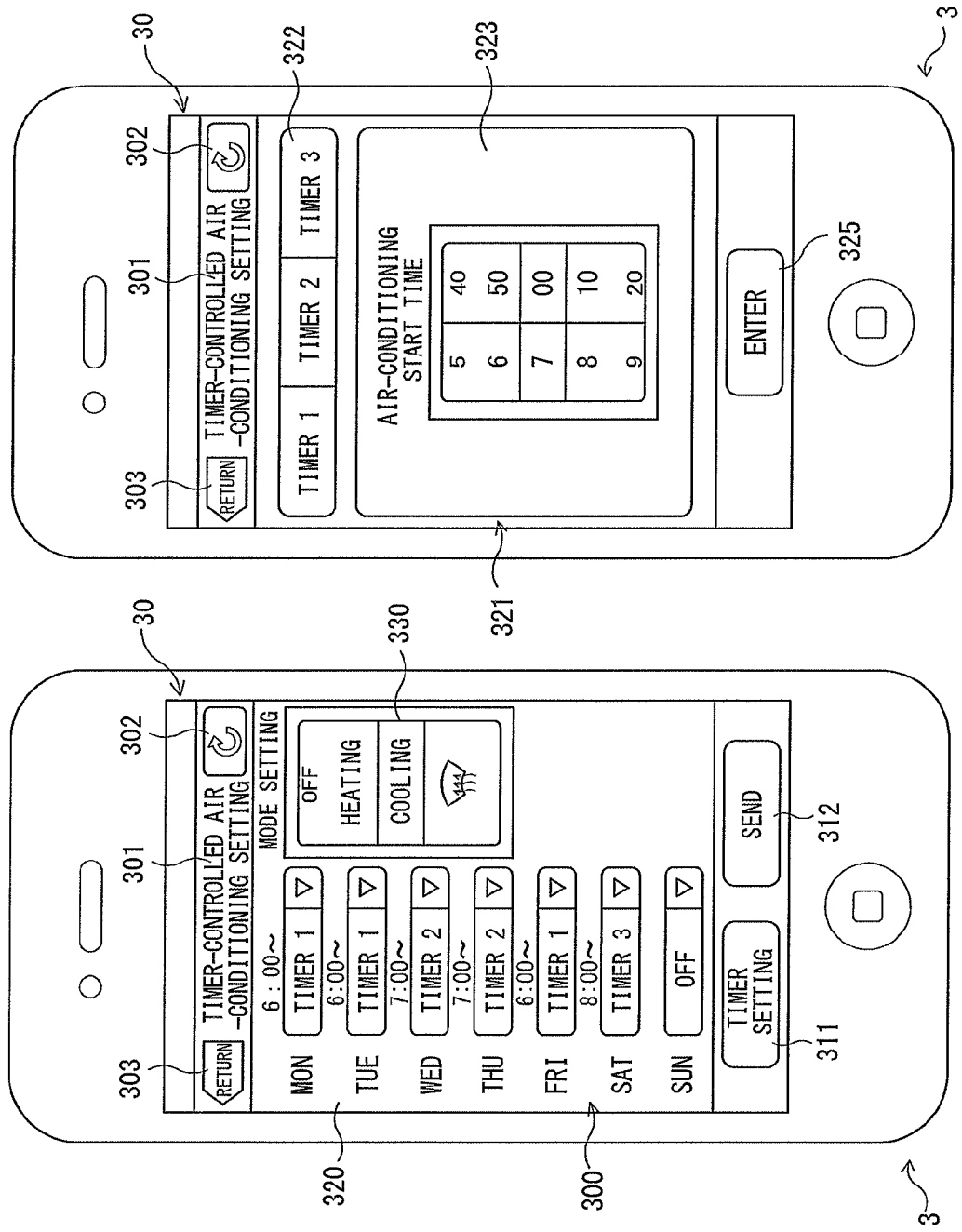

US 9,076,324 B2

REMOTE CONTROL SYSTEM FOR IN-VEHICLE DEVICE

CROSS-REFERENCE TO THE RELATED APPLICATION

This application incorporates by references the subject matter of Application No. 2012-214707 filed in Japan on Sep. 27, 2012 on, which a priority claim is based under 35 U.S.C. §119(a).

FIELD

The present invention relates to a system that remotely controls devices installed in an automobile.

BACKGROUND

Techniques have been developed and widely used for remote control of devices installed in automobiles (hereinafter, also referred to as "vehicles"). For example, techniques have been developed for starting engines of vehicles by remote control to preliminarily warm-up the engines, and for activating air conditions of vehicles by remote control to control a temperature in the vehicles after starting the engines before passengers enter the vehicles. Such techniques are disclosed in Japanese Laid-open Patent Publication No. 11-230013 (patent document 1).

Patent document 1 describes a technique involving a control circuit for control of an aftermarket electric device installed in a vehicle. This vehicle has an engine control circuit that is wirelessly controllable to start/stop the engine of the vehicle through operation of a portable controller (remote controller) provided with a start switch and a stop switch. The aftermarket electric device is turned on by an operation-start signal which is an operation signal from the start switch during operation of the engine and turned off by an operation-stop signal which is an operation signal from the stop switch during a halt of the engine.

SUMMARY

Summary of the Invention

In one aspect, a remote control system for in-vehicle devices of the present invention includes an in-vehicle-device controller installed in a vehicle and controlling an in-vehicle device installed in the vehicle; a mobile communication device that remotely controls the in-vehicle device via the in-vehicle-device controller; and a wireless communication device installed in the vehicle and intervening and establishing wireless communication between the in-vehicle-device controller and the mobile communication device, the wireless communication device including a reception-mode switching unit switching between a reception standby mode with consumption of a standby current preparing for reception from the mobile communication device and a reception dormant mode without consumption of the standby current; and a mode-switch timing storage unit storing a time schedule transmitted for the reception standby mode and the reception dormant mode, and the reception-mode switching unit switches between the reception standby mode or the reception dormant mode in accordance with the time schedule stored in the mode-switch timing storage unit.

BRIEF DESCRIPTION OF DRAWINGS

FIGS. 5A and 5B illustrate a display menu (timer-controlled charge setting menu) of a mobile communication device or a multifunctional portable terminal of a remote control system for in-vehicle devices according to an embodiment of the present invention; FIG. 5A illustrates a menu for setting the schedule of timer-controlled charge; and FIG. 5B illustrates a menu for setting the timer.

FIGS. 6A and 6B illustrate a display menu (menu for setting timer-controlled air-conditioning) of a mobile communication device or a multifunctional portable terminal of a remote control system for in-vehicle devices according to an embodiment of the present invention; FIG. 6A illustrates a menu for setting the schedule of timer-controlled air-conditioning; and FIG. 6B illustrates a menu for setting the timer.

FIG. 13A illustrates a menu for setting a standby schedule; and FIG. 13B illustrates a menu for setting timers.

DESCRIPTION OF EMBODIMENTS

Figure 1:
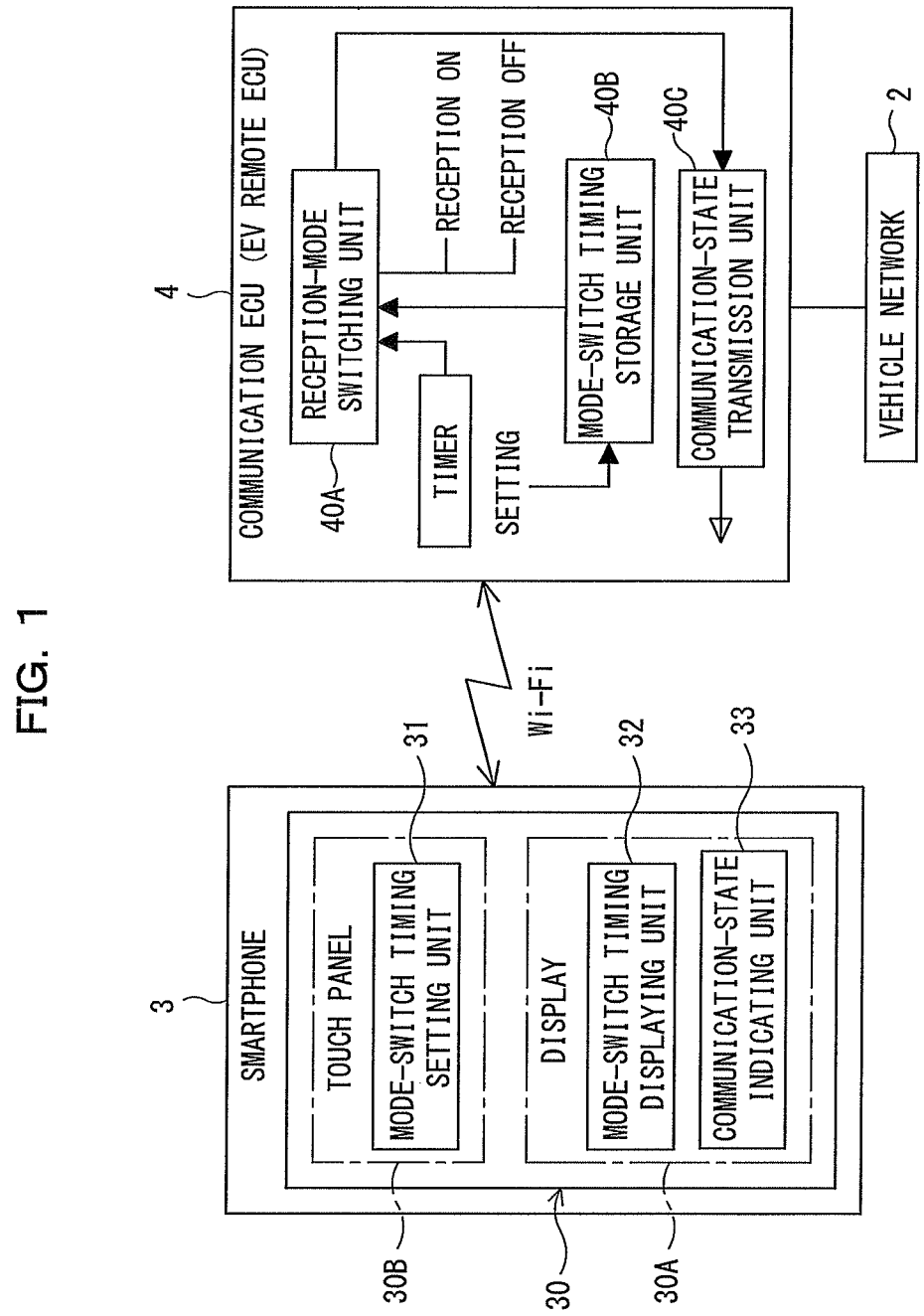
FIG. 1 is a block diagram illustrating a wireless communication device in a vehicle in a remote control system for in-vehicle devices according to an embodiment of the present invention, with focus on the timing control of the switching of communication modes.

First, the subject of the present invention is explained.

In addition to the preliminary air-conditioning described above, the inventors have believed that electric vehicles and plug-in hybrid vehicles that are chargeable via household wall sockets can be more convenient with remote detection and control of the electrical charge of the vehicles in a chargeable state in which the charging systems of the vehicles are connected to electric sockets. Such remote control of various devices enhances the convenience of the vehicles in use.

Dedicated portable controllers provided for the respective devices to be remotely controlled lead to increased costs, management burden, and incorrect operation.

Such drawbacks are solved by the technique disclosed in patent document 1, which enables a portable controller to be shared among devices to be remotely controlled.

This technique uses a switch operation logic of a single switch to remotely control multiple devices. Consequently, an increase in the number of devices to be remotely controlled causes an increase in the complexity of the switch operation logic. Such a complicated switch operation logic cannot be readily operated and may lead to incorrect operation. The portable controller may be equipped with switches corresponding to the devices to be remotely controlled. In such a case, however, the switch configuration of the portable controller becomes complicated, and makes operation difficult that incorrect operation would increase.

The inventors have conceived the use of mobile communication devices, such as mobile phones, for remote control of various devices in a vehicle. The mobile phones popular today are multifunctional mobile phones, which are referred to as "smartphones." Smartphones have functions similar to those of personal computers and personal digital assistants (PDAs), and typically are equipped with touch panel displays. Thus, application software can be downloaded to obtain desired functions, allowing smartphones to remotely control in-vehicle devices.

That is, the application software can be developed to display a menu and switch buttons on a touch panel display for remote control of devices and to operate the switch buttons. The application software can be downloaded to a smartphone, enabling the smartphone to be used as a remote controller of the devices. The flexibility in the menu display facilitates appropriate operations without incorrect operation.

Wireless communication between a mobile communication device, such as a smartphone, and a vehicle requires the vehicle to be equipped with a wireless communication device (in-vehicle ECU) supporting the communication standard (network interface) employed by the mobile communication device. The communication standards of smartphones include Wi-Fi (trademark) and 3G. In addition to these, communication standards, such as WiMAX (trademark) and Bluetooth (trademark) may also be used.

Among these communication standards, Wi-Fi has a relatively high communication rate, a relatively large wireless communication distance, and a low running cost due to its high versatility that does not require a communication infrastructure. Thus, mobile communication devices that support Wi-Fi can be readily used for remote control of in-vehicle devices. In such a case, a wireless communication device supporting such a standard is installed in the vehicle.

Generally, such a wireless communication device in the vehicle is always in a communication standby mode and is ready to receive transmission from a smartphone or any other devices at all times.

Unfortunately, the wireless communication device in the vehicle that is in a communication standby mode constantly discharges its battery, which is the power source of the vehicle, due to a standby current. As a result, the state of charge of the battery rapidly decreases. Although the constant standby mode of the wireless communication device is advantageous, this standby state requires a large standby current and causes a rapid decrease the state of charge of the battery.

Especially, the state of charge of a battery having a small capacity tends to drop significantly due to the consumption by the standby current. This is a major problem.

In contrast, electric vehicles and plug-in hybrid vehicles have large capacity batteries for running the vehicles. A decrease in the state of charge of the battery in one of those vehicles can be suppressed by using the electric power charged in the battery. Electric vehicles, however, still require an improvement in a traveling range by motor power. Thus, there is a strong need for saving battery power, and preventing consumption of the battery power by the standby current.

An object of the present invention, which has been conceived by solving the drawbacks described above, is to provide remote control system that remotely controls in-vehicle devices with a mobile communication device, such as a smartphone, and that controls a standby timing of a wireless communication device in a vehicle to suppress a decrease in the state of charge of an in-vehicle battery by a reduction in electric power consumption due to a communication standby current of the wireless communication device in the vehicle.

Embodiments of the present invention will now be described with reference to the accompanying drawings.

The vehicle according to this embodiment is a plug-in hybrid electric vehicle (PREY) equipped with a main battery (a battery for running) chargeable via a general power source (100 V source) provided outside the vehicle, such as a household wall socket. The in-vehicle devices to be remotely controlled include the main battery of the vehicle and a charge controller for controlling the charge of the main battery.

[Overall System Configuration]

Figure 2:
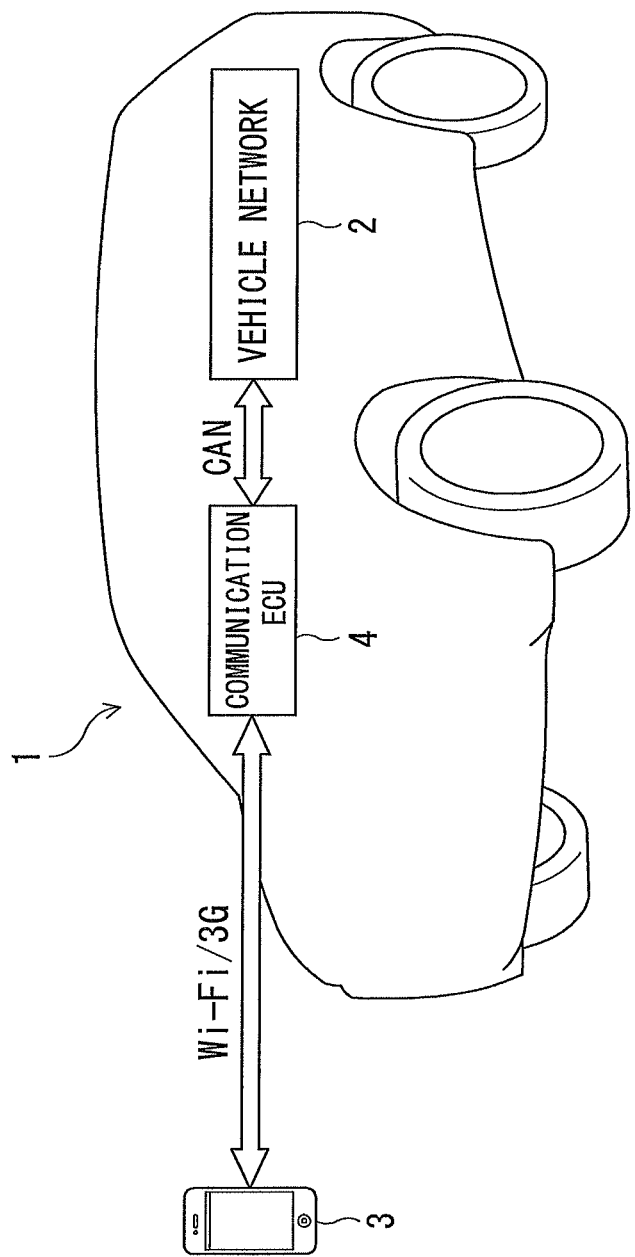
FIG. 2 is a schematic view of a remote control system for in-vehicle devices according to an embodiment of the present invention.

FIG. 2 is a schematic view of a remote control system for in-vehicle devices according to this embodiment. As illustrated in FIG. 2, the remote control system includes a vehicle network 2, a multifunctional portable terminal (smartphone) 3, and a communication ECU (also referred to as "wireless communication device" or "EV remote ECU") 4. The vehicle network 2 is installed in a vehicle 1 and includes various controllers (in-vehicle-device controllers) that control in-vehicle devices. The smartphone 3 or a mobile communication device is used to remotely control the in-vehicle devices. The communication ECU 4 is installed in the vehicle 1 and intervenes between the controllers of the vehicle network 2 and the smartphone 3 and functions as a wireless router for wireless communication.

The communication between the communication ECU 4 and the vehicle network 2 is established via a wired controller area network (CAN), while the communication between the communication ECU 4 and the smartphone 3 is established via wireless LAN communication such as wireless fidelity (Wi-Fi) or 3rd generation (3G) scheme. In this embodiment, the Wi-Fi scheme is used for the communication between the communication ECU 4 and the smartphone 3.

The CAN is widely used as the vehicle network 2 because of its high tolerance to noise and the independence of communication lines that allows communication via the remaining lines even after a disconnection of one of the lines. The CAN is also used for communication between the communication ECU 4 and the vehicle network 2.

The Wi-Fi scheme is used for the communication between the communication ECU 4 and the smartphone 3 because the Wi-Fi scheme is supported by many commercially available smartphones and other mobile communication devices, has a relatively high communication rate, has a relatively large wireless communication distance (maximum sight distance for communication with the vehicle is approximately 200 m), and has a low running cost due to its high versatility that does not require a communication infrastructure.

In this embodiment, a mobile communication device by the Wi-Fi scheme is exemplified by a smartphone. Alternatively, any other mobile communication device may be used that can support the Wi-Fi communication (Wi-Fi devices) and download application programs (application software) for the remote control system.

Figure 3:
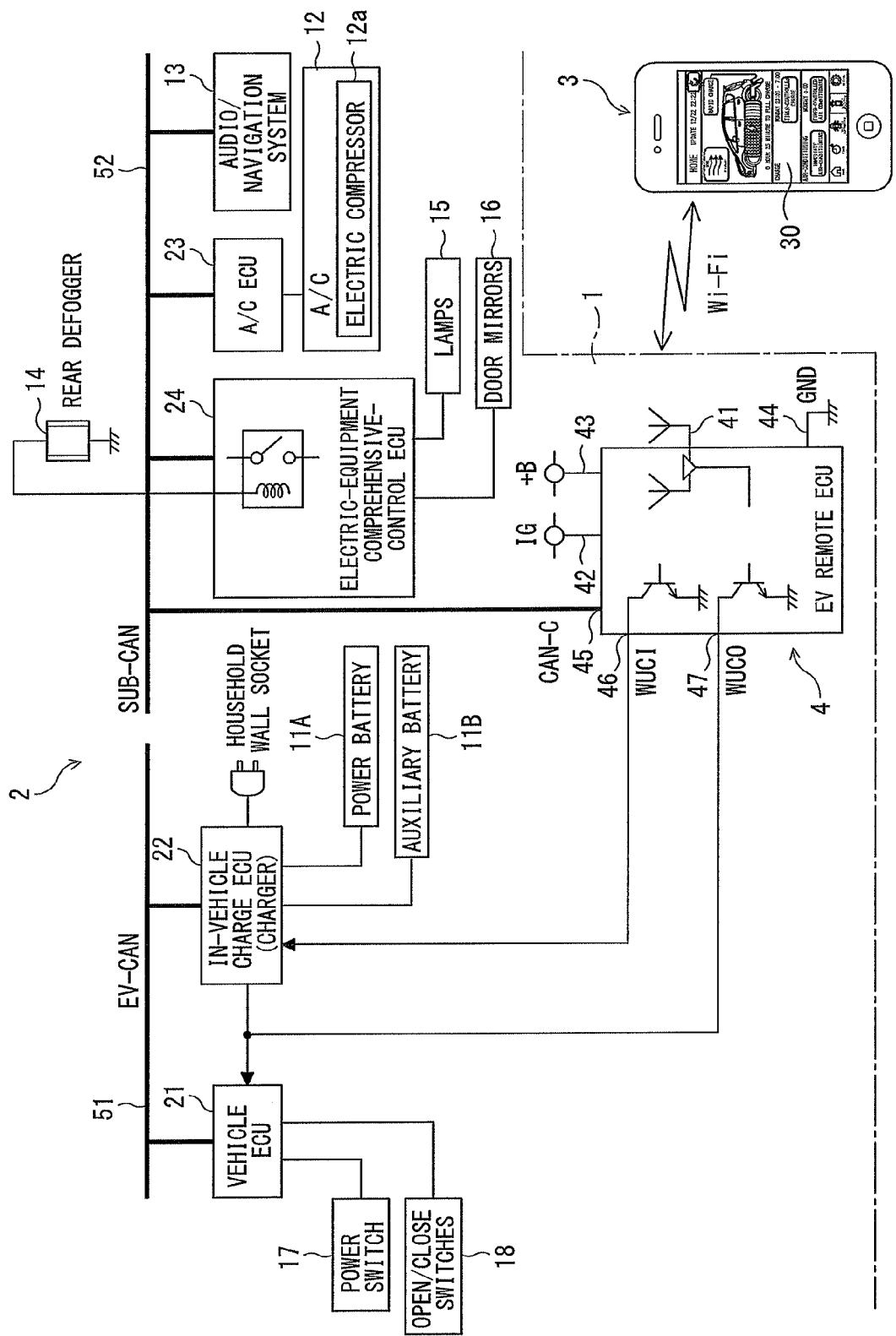
FIG. 3 is a detailed schematic view of a remote control system for in-vehicle devices according to an embodiment of the present invention.

FIG. 3 illustrates the detailed configuration of the remote control system. As illustrated in FIG. 3, the vehicle is equipped with in-vehicle devices, such as a main or power battery 11A, an auxiliary battery 11B, an air-conditioner 12, an audio/navigation system 13, a rear defogger 14, and various electric components including lamps 15, door mirrors 16, and wind-shield wipers (not shown). The air-conditioner 12 includes an electric compressor 12a. The electric compressor 12a receives power from the main battery 11A, which is a high-voltage source.

The vehicle is also equipped with in-vehicle-device controllers that control the in-vehicle devices, such as a vehicle ECU 21, an in-vehicle charge ECU (charger) 22, an air-conditioning ECU 23, and a comprehensive electrical-equipment control ECU 24. The vehicle ECU 21 controls the vehicle comprehensively. The in-vehicle charge ECU 22 controls the charge state of the main battery. The air-conditioning ECU 23 controls the air-conditioner 12. The comprehensive electrical-equipment control ECU 24 controls the operation of the electric components, such as the rear defogger 14, the lamps 15, and the door mirrors 16.

The in-vehicle-device controllers or the ECUs 21 to 24, the smartphone 3, and the communication ECU 4 each include an input/output device, a storage device (memory such as an ROM, an RAM, and/or non-volatile RAM), a central processing unit (CPU), and a timer/counter.

The vehicle ECU 21 and the in-vehicle charge ECU 22 are connected via an electric vehicle CAN (EV-CAN) 51, while the air-conditioning ECU 23, the comprehensive electrical-equipment control ECU 24, and the audio/navigation system 13 are connected via an electrical-equipment CAN (SUB-CAN) 52. The EV-CAN 51 and the SUB-CAN 52 are connected via a gateway (not shown).

The vehicle ECU 21 turns on/off a power switch 17 of the vehicle and open/close switches 18 of the doors and receives information on the on/off state of the switches 17 and 18.

The in-vehicle charge ECU 22 controls an in-vehicle charge unit 11 that charges the main battery 11A and the auxiliary battery 11B. In particular, the in-vehicle charge unit 11 can charge the batteries 11A and 11B via a dedicated charge socket installed in a charge station or a general power source, such as a household wall socket.

Three charge modes are provided: "rapid charge" using a dedicated external rapid charger; "200 V normal charge" using a dedicated 200 V external charger; and "100 V normal charge" using a 100 V general power source, such as a household wall socket. "Timer-controlled charge" or scheduled charge is carried out with a timer set in advance in accordance with a charge schedule. Timer-controlled charge is carried out in the 100 V normal charge mode.

The air-conditioner 12 air-conditions (cools/heats) the interior of the vehicle and blasts air onto the front windshield. A "timer-controlled air-conditioning" mode is provided for air-conditioning of the interior of the vehicle and/or air blast onto the front windshield in accordance with an air-conditioning schedule set in advance by the timer. The air-conditioning ECU 23 carries out real-time air-conditioning and timer-controlled air-conditioning.

The air-conditioning modes include "air-conditioning (cooling) standby," "air-conditioning (cooling)," "air-conditioning (heating) standby," "air-conditioning (heating)," "air-conditioning (front windshield blast) standby," and "air-conditioning (front windshield blast)" modes. In each air-conditioning standby mode, the air-conditioning is scheduled but is not yet carried out.

The comprehensive electric-equipment control ECU 24 controls the operation of the electric components, such as the rear defogger 14, the lamps 15 including head lights and position lamps, the door mirrors 16, and windshield wipers, and detects the operating state of these electric components.

The communication ECU 4 includes a transmission/reception antenna 41, an IG terminal 42, a +B terminal 43, a ground terminal 44, a CAN connection terminal 45, a charge-standby-signal output unit 46, and a system-start-signal output unit 47. The IG terminal 42 connects to an ignition power source when the key switch is in the position of ON or START. The +B terminal 43 is in constant connection with the battery power source. The ground terminal 44 is grounded. The CAN connection terminal 45 is connected to a high-speed CAN (CAN-C). The charge-standby-signal output unit 46 outputs a signal WUCI for temporarily holding the charge functions. The system-start-up-signal output unit 47 outputs a WakeUp signal WUCO for starting the system of the electric vehicle.

[Display Menu of Smartphone (Mobile Communication Device)]

Figure 4:
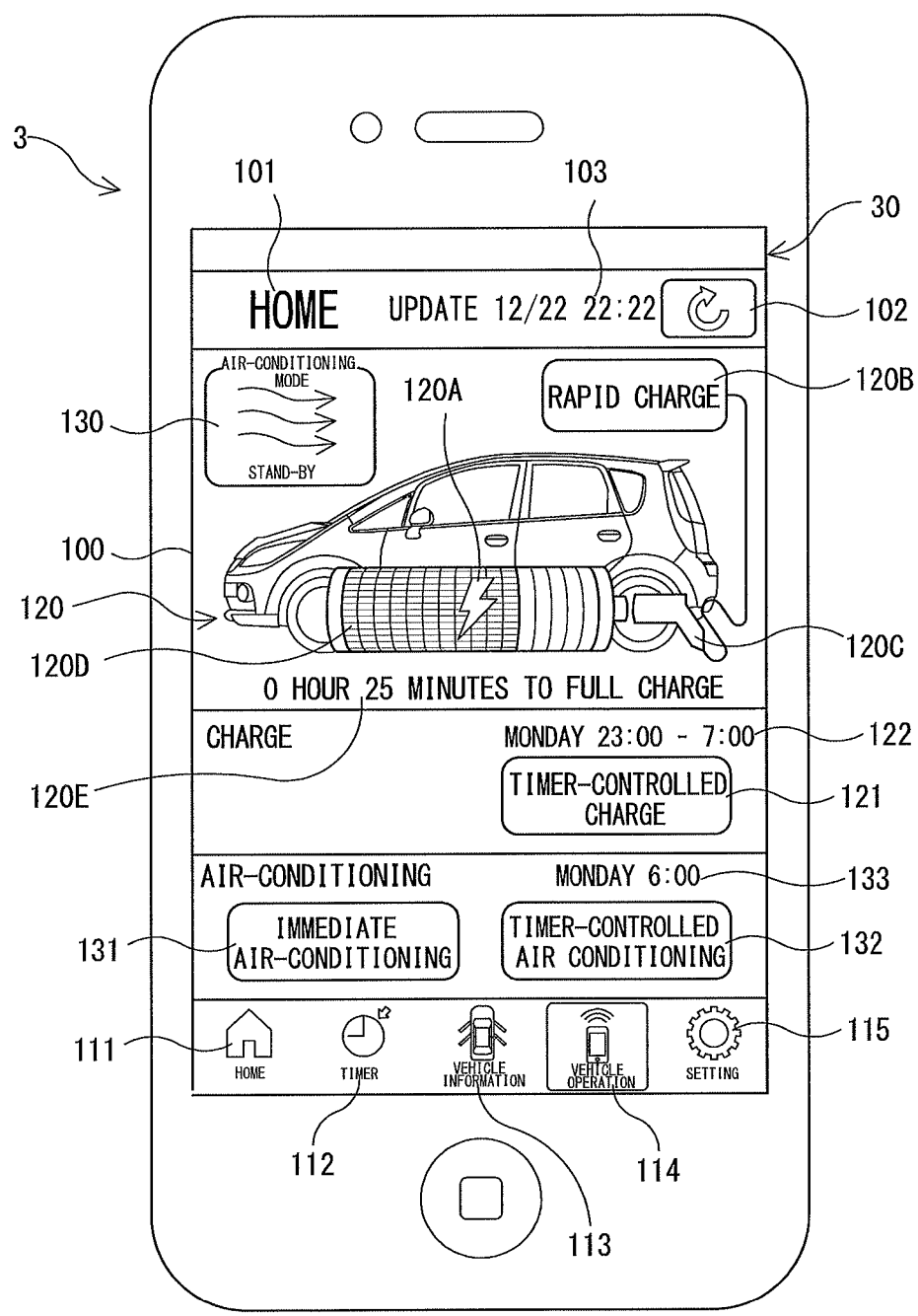
FIG. 4 illustrates a display menu (home menu) of a mobile communication device or a multifunctional portable terminal of a remote control system for in-vehicle devices according to an embodiment of the present invention.

Application software of the remote control system is downloaded to the smartphone 3 and launched to display an image such as that illustrated in FIG. 4 on the screen of the touch panel display 30 of the smartphone 3.

As in FIG. 4, a home menu 100 is displayed upon start-up. The top edge region of the home menu 100 displays a menu title (home) 101, an update button (switch button) 102, and the time and date 103 of the update. The bottom edge region of the home menu 100 displays a mode selection buttons (switch buttons) consisting of a home button 111, a timer button 112, a vehicle information button 113, a vehicle operation button 114, and a setting button 115. The home menu 100 illustrated in FIG. 4 is displayed upon start-up or upon a touch operation of the home button 111.

The remaining center area of the home menu 100 other than the top edge and the bottom edge regions displays a charge indicator 120 and the air-condition indicator 130 in the upper part. The lower part displays a timer-controlled charge button 121, a timer-controlled charge setting 122, a rapid air-conditioning button 131, a timer-controlled air-conditioning button 132, and a timer-controlled air-conditioning setting 133.

If the battery is being charged, the charge indicator 120 displays a charging mark 120A and the current charge mode 120B, which is selected from one of the "rapid charge," "200 V normal charge," and "100 V normal charge." The connection 120C of a charge plug and a charge gun is also indicated. While the battery is being charged, the connection 120C of the charge plug is "connected." While a charge schedule is being set by the timer in advance, the connection 120C of the charge plug is being "connected", and the battery is being uncharged, "charge standby" is displayed as the charge mode 120B. The charge indicator 120 includes a schematic graph 120D representing the state of charge and the time 120E required for full charge.

The timer-controlled charge button 121 is operated to turn on/off the timer-controlled charge. Each time the timer-controlled charge button 121 is touched, it alternates between an ON state and an OFF state. The on/off state of the button may be distinguished by turning on/off (or increasing/decreasing the brightness of) a light or by changing the color of the button.

The rapid air-conditioning button 131 is touched to turn on/off rapid air-conditioning (immediate air-conditioning). Each time the rapid air-conditioning button 131 is operated, it alternates between an ON state and an OFF state. The on/off state of the button may be distinguished by turning on/off (or increasing/decreasing the brightness of) a light or by changing the color of the button.

The timer-controlled air-conditioning button 132 turns on/off the timer-controlled air-conditioning. Each time the timer-controlled air-conditioning button 132 is touched, the air-conditioning mode alternates between an ON state and an OFF state. The ON/OFF state of the button may be distinguished by turning on/off (or increasing/decreasing the brightness of) a light or changing the color of the button.

Turning on the timer-controlled charge button 121 and then touching the timer button 112 display a timer-controlled charge setting menu 200, as illustrated in FIG. 5A. The top edge region of the timer-controlled charge setting menu 200 displays a menu title (timer-controlled charge setting) 201, an update button (switch button) 202, and a return button (switch button) 203. The bottom edge region displays a timer setting button 211 and a send button 212.

The left half of the remaining center area of the timer-controlled charge setting menu 200 other than the top edge and the bottom edge regions displays a charge schedule 220 set for every day of the week. The right half of the area displays selection switch buttons 230 for turning on/off full charge. The charge schedule 220 can be set to OFF (timer-controlled charge turned off) or to one of the schedules set in advance (here there are three schedules set in advance referred to as "Timer 1," "Timer 2," and "Timer 3").

The settings for Timers 1, 2, and 3 can be changed by the selection of the day of the week and a touch of the timer setting button 211 to display a timer setting menu 221, as illustrated in FIG. 5B. The timer setting menu 221 includes selection switch buttons 222 corresponding to Timers 1, 2, and 3 and a scroll menu 223 for selecting the start time (hour and minute) and the end time (hour and minute) of the charge. One of Timers 1, 2, and 3 is selected, and the scroll menu is operated to set the start time or the end time of the charge. The charge time 224 is determined on the basis of the time set on the scroll menu 223 and is displayed below the scroll menu 223.

The bottom edge region of the timer setting menu 221 displays an enter button 225, which is touched to return to the timer-controlled charge setting menu 200 illustrated in FIG. 5A. Then, the send button 212 is touched to send the charge schedule setting information to the communication ECU 4 of the vehicle. The charge schedule setting information is sent from the communication ECU 4 to the in-vehicle charger ECU 22 and stored in the memory of the in-vehicle charger ECU 22. The in-vehicle charger ECU 22 charges the batteries in accordance with the charge schedule stored in the memory.

Similarly, turning on the timer-controlled air-conditioning button 132 and then touching the timer button 112 display a timer-controlled air-conditioning setting menu 300, as illustrated in FIG. 6A. The top edge region of the timer-controlled air-conditioning setting menu 300 displays a menu title (timer-controlled air-conditioning setting) 301, an update button (switch button) 302, and a return button (switch button) 303. The bottom edge region displays a timer setting button 311 and a send button 312.

The left half of the remaining center area of the timer-controlled air-conditioning setting menu 300 other than the top edge and the bottom edge regions displays the air-conditioning schedule 320 set for every day of a week. The right half of the area displays the air-conditioning modes (heating, cooling, defogging, or OFF) 330. The air-conditioning schedule 320 can also be set to OFF (timer-controlled air-conditioning turned off) or to one of the schedules set in advance (here there are three schedules set in advance referred to as "Timer 1," "Timer 2," and "Timer 3").

Similar to the timer-controlled charge, the settings for Timers 1, 2, and 3 can be changed by the selection of the day of the week and a touch of the timer setting button 311 to display a timer setting menu 321, as illustrated in FIG. 6B. The timer setting menu 321 includes selection switch buttons 322 corresponding to Timers 1, 2, and 3 and a scroll menu 323 for selecting the start time (hour and minute) of the air-conditioning. One of Timers 1, 2, and 3 is selected, and the scroll menu is operated to set the start time of the air-conditioning.

The bottom edge region of the timer setting menu 321 displays an enter button 325, which is touched to return to the timer-controlled air-conditioning setting menu 300 illustrated in FIG. 6A. Then, the send button 312 is operated to send the air-conditioning schedule setting information to the communication ECU 4 of the vehicle. The air-conditioning schedule information is sent from the communication ECU 4 to the air-conditioning ECU 23 and stored in the memory of the air-conditioning ECU 23. The air-conditioning ECU 23 starts air-conditioning of the vehicle in accordance with the air-conditioning schedule stored in the memory.

Figure 7:
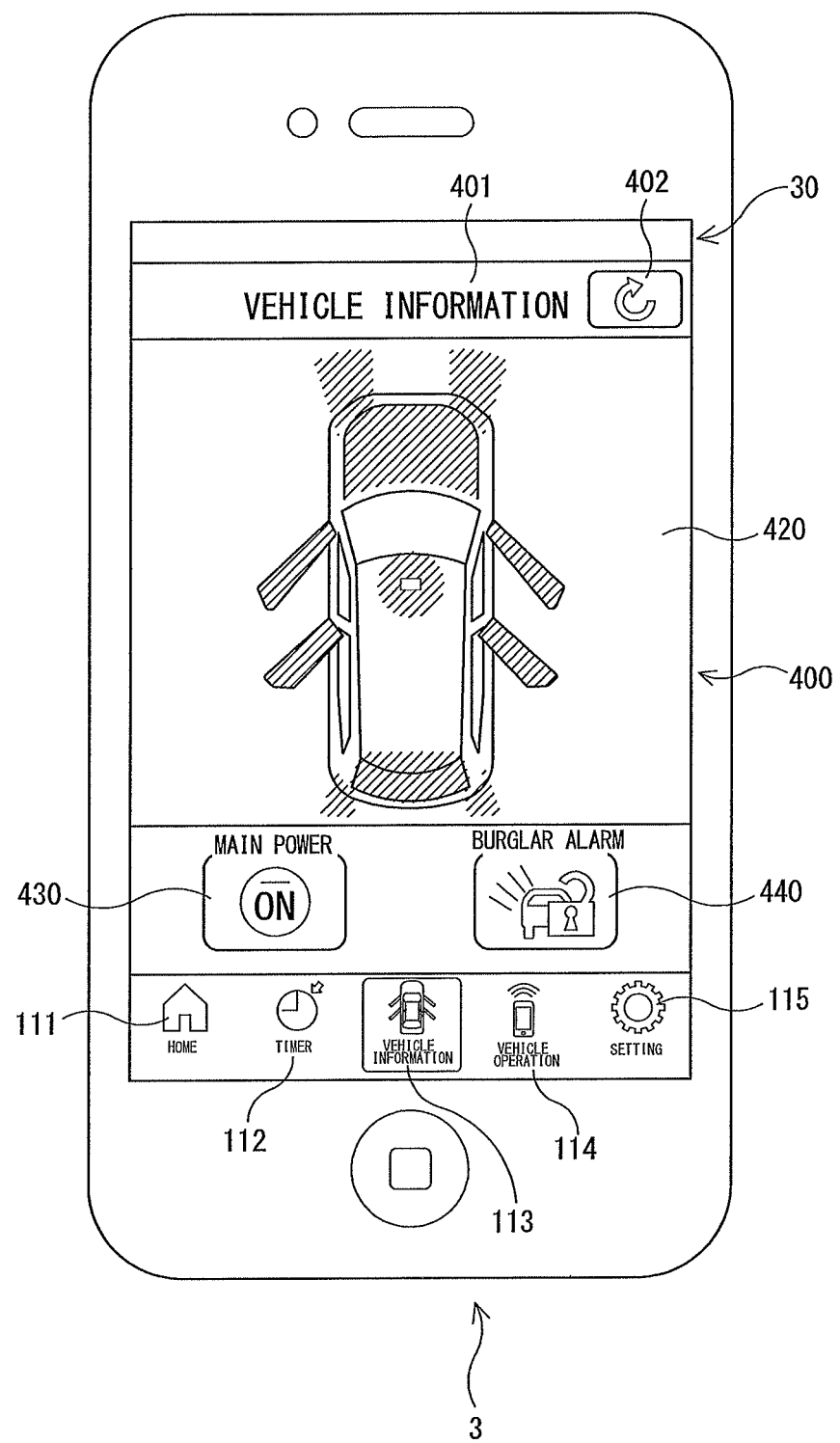
FIG. 7 illustrates a vehicle information menu of a mobile communication device or a multifunctional portable terminal of a remote control system for in-vehicle devices according to an embodiment of the present invention.

The vehicle information button 113 on the home menu 100 is touched to display a vehicle information menu 400 illustrated in FIG. 7. The top edge region of the vehicle information menu 400 displays a menu title (vehicle information) 401 and an update button (switch button) 402. Similar to the home menu 100, the bottom edge region displays various buttons (switch buttons), such as a home button 111, a timer button 112, a vehicle information button 113, a vehicle operation button 114, and a setting button 115.

The remaining center area of the vehicle information menu 400 other than the top edge and the bottom edge regions displays an operating state 420 of the lamps and the doors in the upper half. A position (ON/OFF) 430 of the power switch (power source) and an operating state 440 of a burglar alarm are displayed in the lower half of the area.

Figure 8:
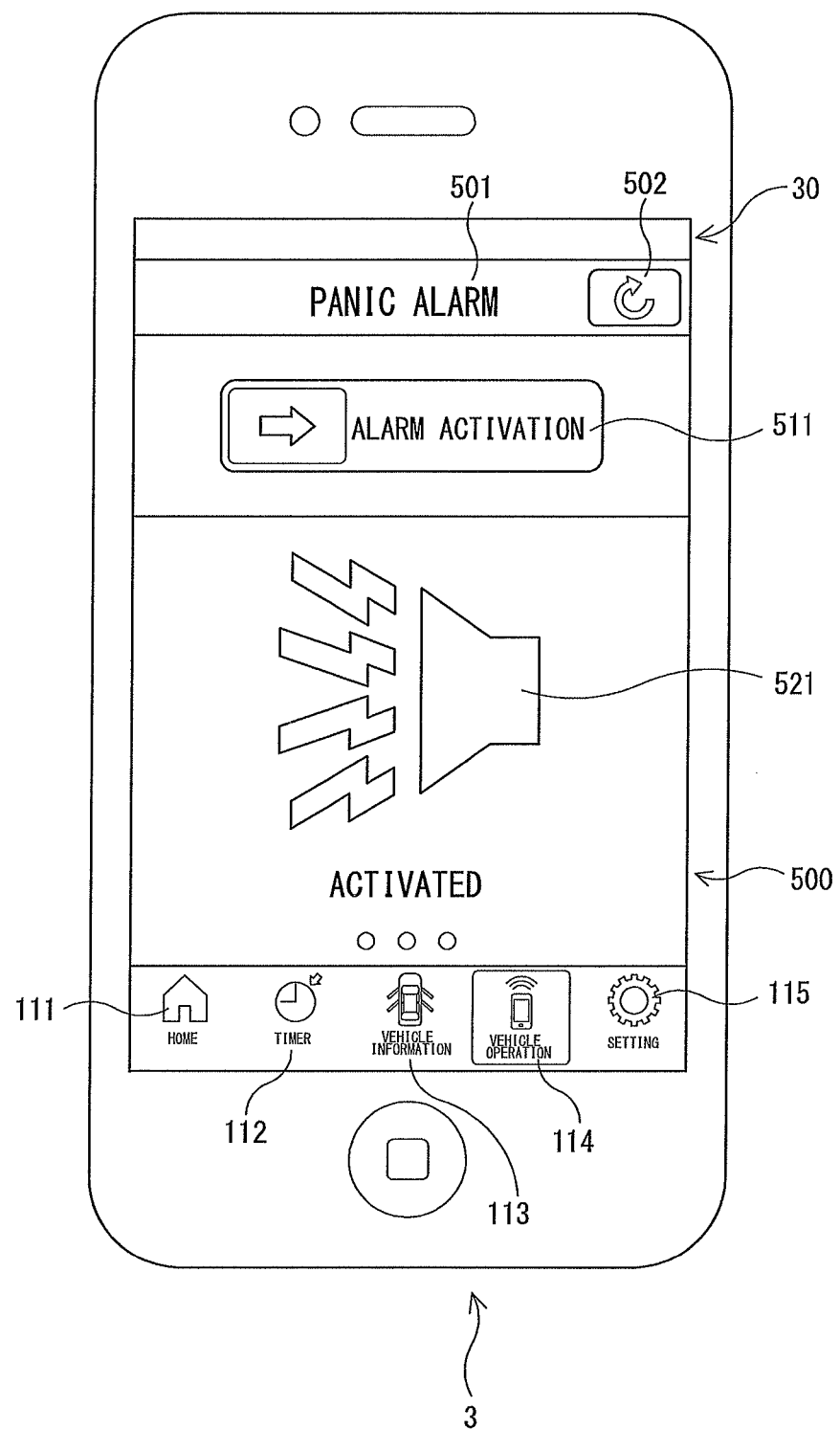
FIG. 8 illustrates a vehicle operation menu (panic alarm) of a mobile communication device or a multifunctional portable terminal of a remote control system for in-vehicle devices according to an embodiment of the present invention.
Figure 9:
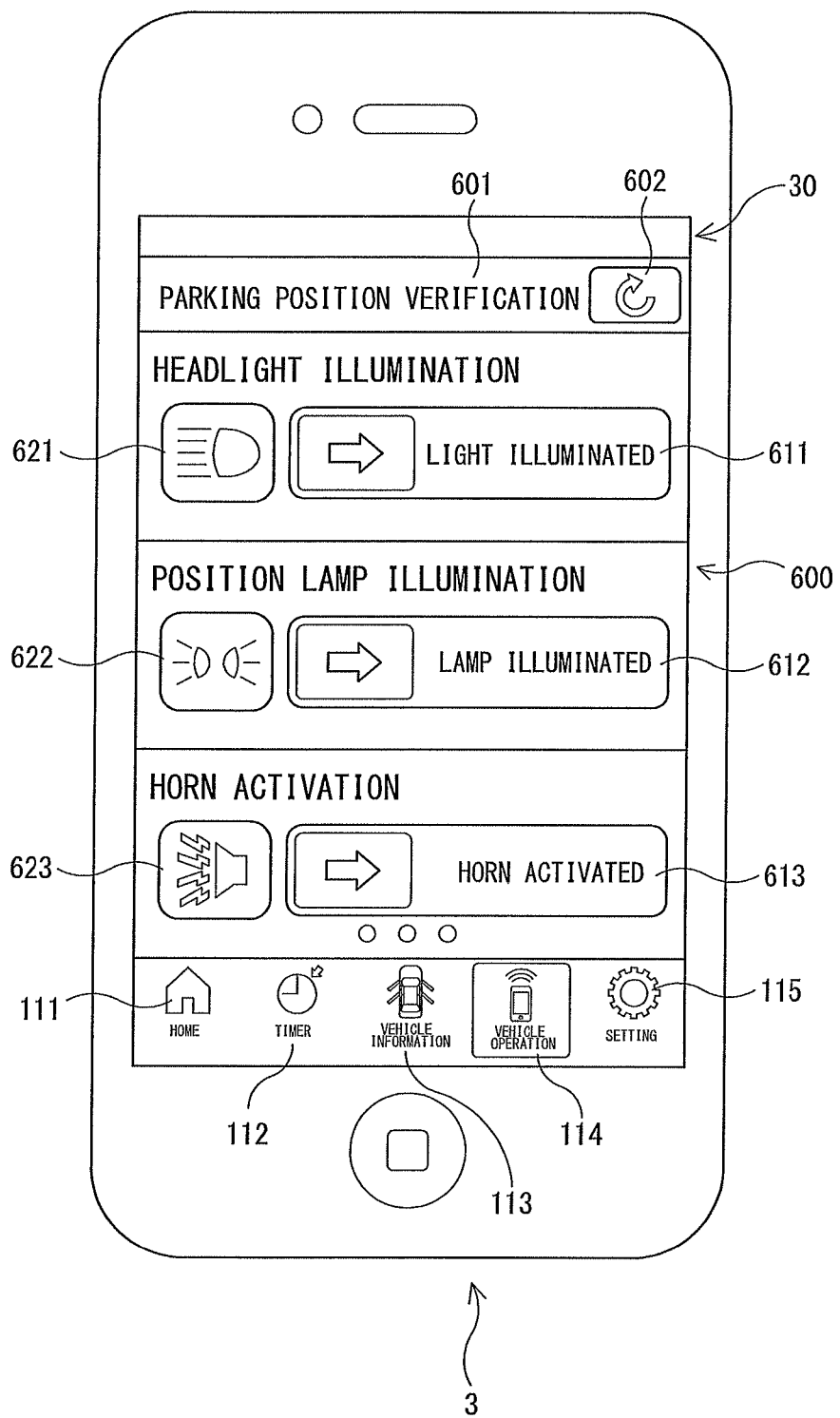
FIG. 9 illustrates a vehicle operation menu (parking position verification) of a mobile communication device or a multifunctional portable terminal of a remote control system for in-vehicle devices according to an embodiment of the present invention.
Figure 10:
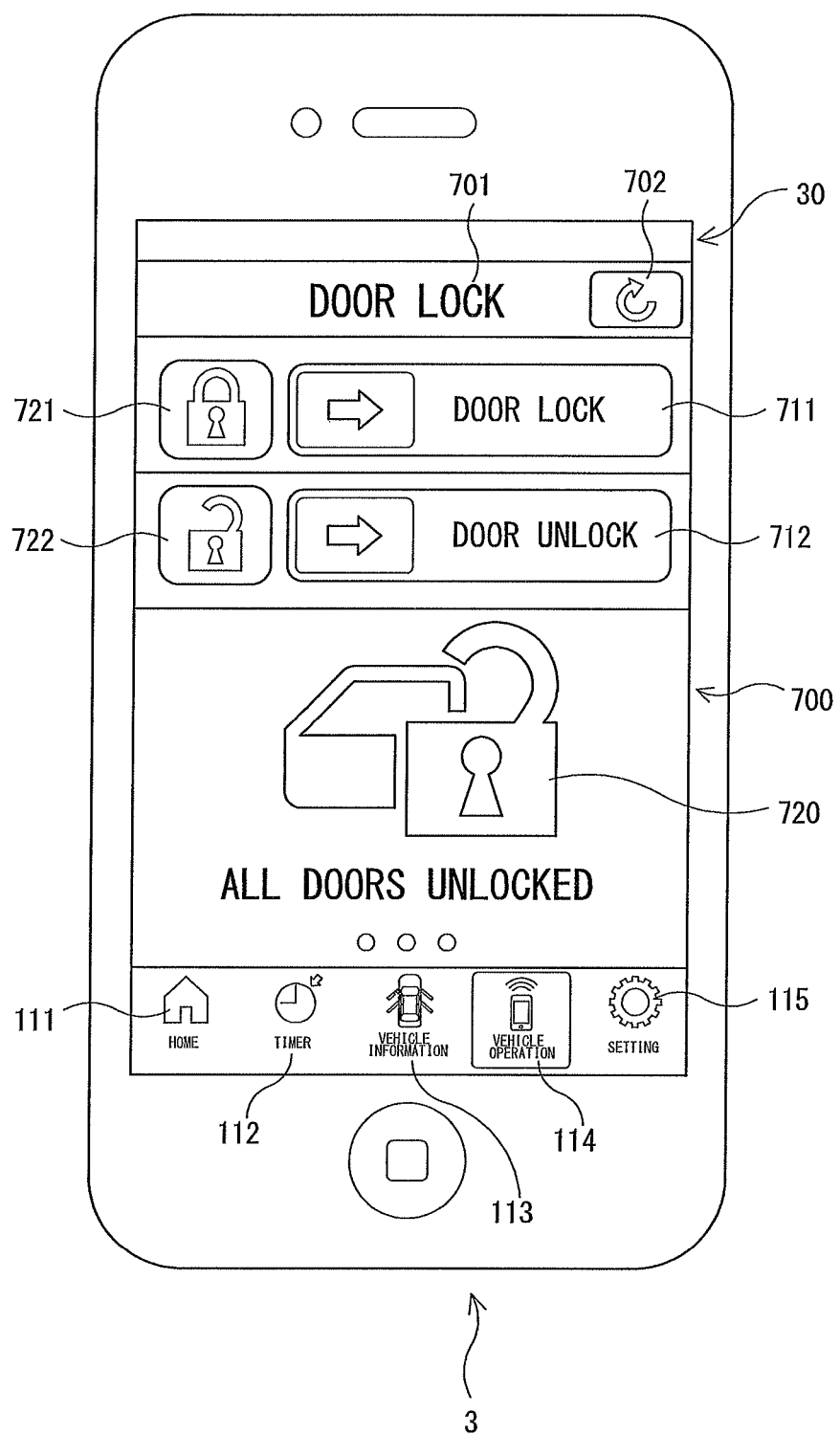
FIG. 10 illustrates a vehicle operation menu (door lock) of a mobile communication device or a multifunctional portable terminal of a remote control system for in-vehicle devices according to an embodiment of the present invention.

The vehicle operation button 114 is touched to display a vehicle operation menu (panic alarm) 500 illustrated in FIG. 8, a vehicle operation menu (parking position verification) 600 illustrated in FIG. 9, or a vehicle operation menu (door lock) 700 illustrated in FIG. 10.

For example, the vehicle operation button 114 on the home menu 100 or the vehicle information menu 400 is touched to display the vehicle operation menu (panic alarm) 500 illustrated in FIG. 8. Then, the vehicle operation button 114 on the vehicle operation menu 500 is touched to display the vehicle operation menu (parking position verification) 600 illustrated in FIG. 9. Then, the vehicle operation button 114 on the vehicle operation menu 600 is operated to display the vehicle operation menu (door lock) 700 illustrated in FIG. 10.

The vehicle operation menus 500, 600, and 700 illustrated in FIGS. 8, 9, and 10, respectively, display, menu titles (panic alarm, parking position verification, and door lock) 501, 601, and 701 and update buttons (switch buttons) 502, 602, and 702 at their top edge regions. Similar to the home menu 100, the bottom edge regions each display various buttons (switch buttons), such as a home button 111, a timer button 112, a vehicle information button 113, a vehicle operation button 114, and a setting button 115.

The remaining center areas of the vehicle operation menus 500, 600, and 700 other than the top edge and the bottom edge regions display slide switches and icons representing different states.

A panic-alarm slide switch 511 in the vehicle operation menu 500 is operated to turn on/off a panic alarm, which is used to sound a warning to the periphery of the vehicle. The ON/OFF state of the panic alarm is indicated by text, by turning on/off (or increasing/decreasing the brightness of) the icon 521, or by changing the color of the icon 521.

A headlight illumination slide switch 611 in the vehicle operation menu 600 of the parking position verification is operated to turn on/off headlights; a position-lamp illumination slide switch 612 is operated to turn on/off the position lamps; and a horn slide switch 613 is operated to activate/deactivate the horn. The ON/OFF state of the headlights, the ON/OFF state of the position lamps, and the activation/deactivation of the horn are indicated by text, by turning on/off (or increasing/decreasing the brightness of) the icons 621, 622, and 623, respectively, or by changing the colors of the icons 621, 622, and 623.

In the case of the vehicle operation menu 700 of the door lock, a door lock slide switch 711 is operated to lock the doors, and a door unlock slide switch 712 is operated to unlock the doors. The locked/unlocked state of the doors and the operating state of the burglar alarm (disabled, enabled, or operating) are indicated by the image, color, and text of icons 720, 721, and 722.

Figure 11:
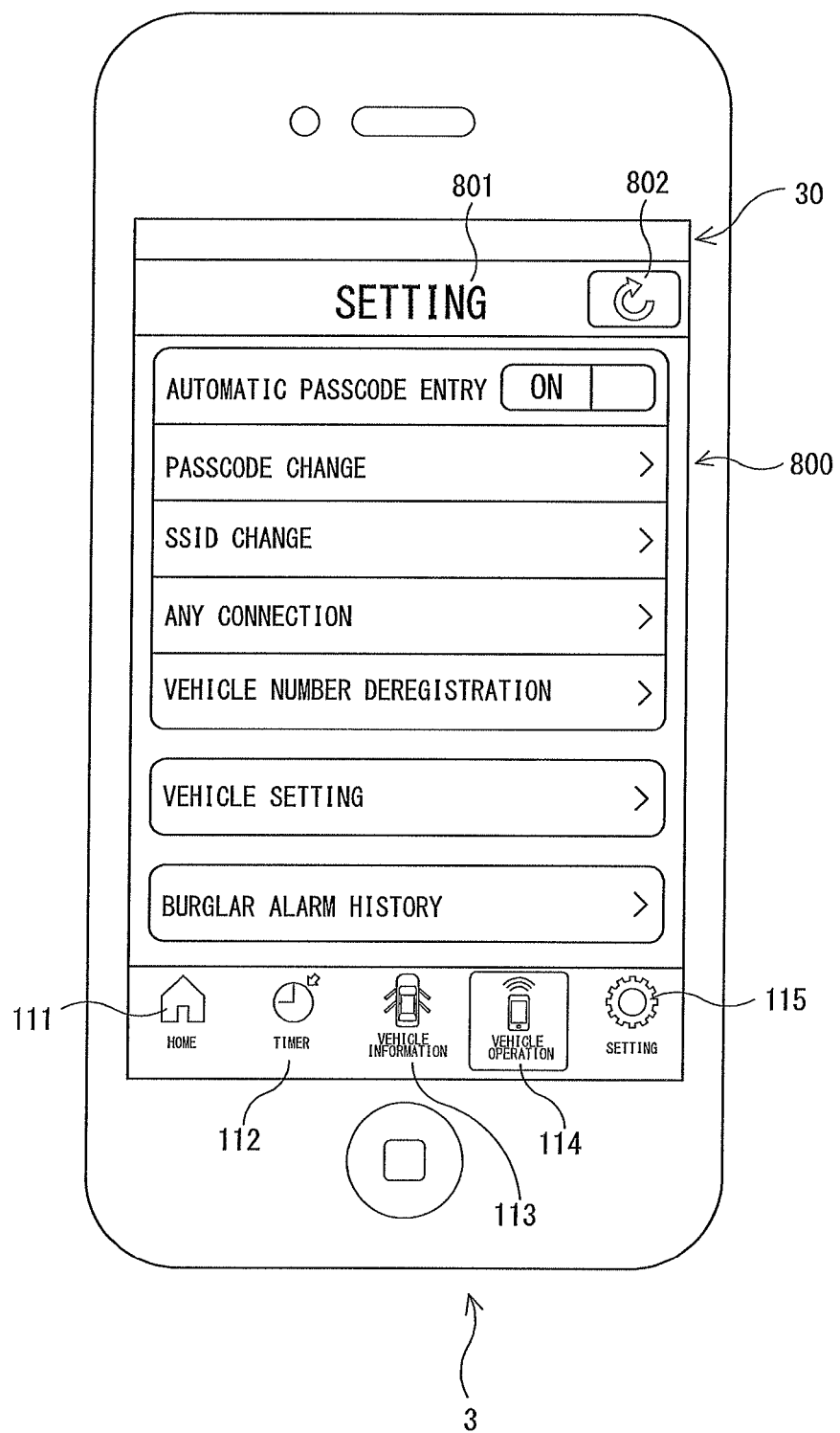
FIG. 11 illustrates a settings menu of a mobile communication device or a multifunctional portable terminal of a remote control system for in-vehicle devices according to an embodiment of the present invention.
Figure 12:
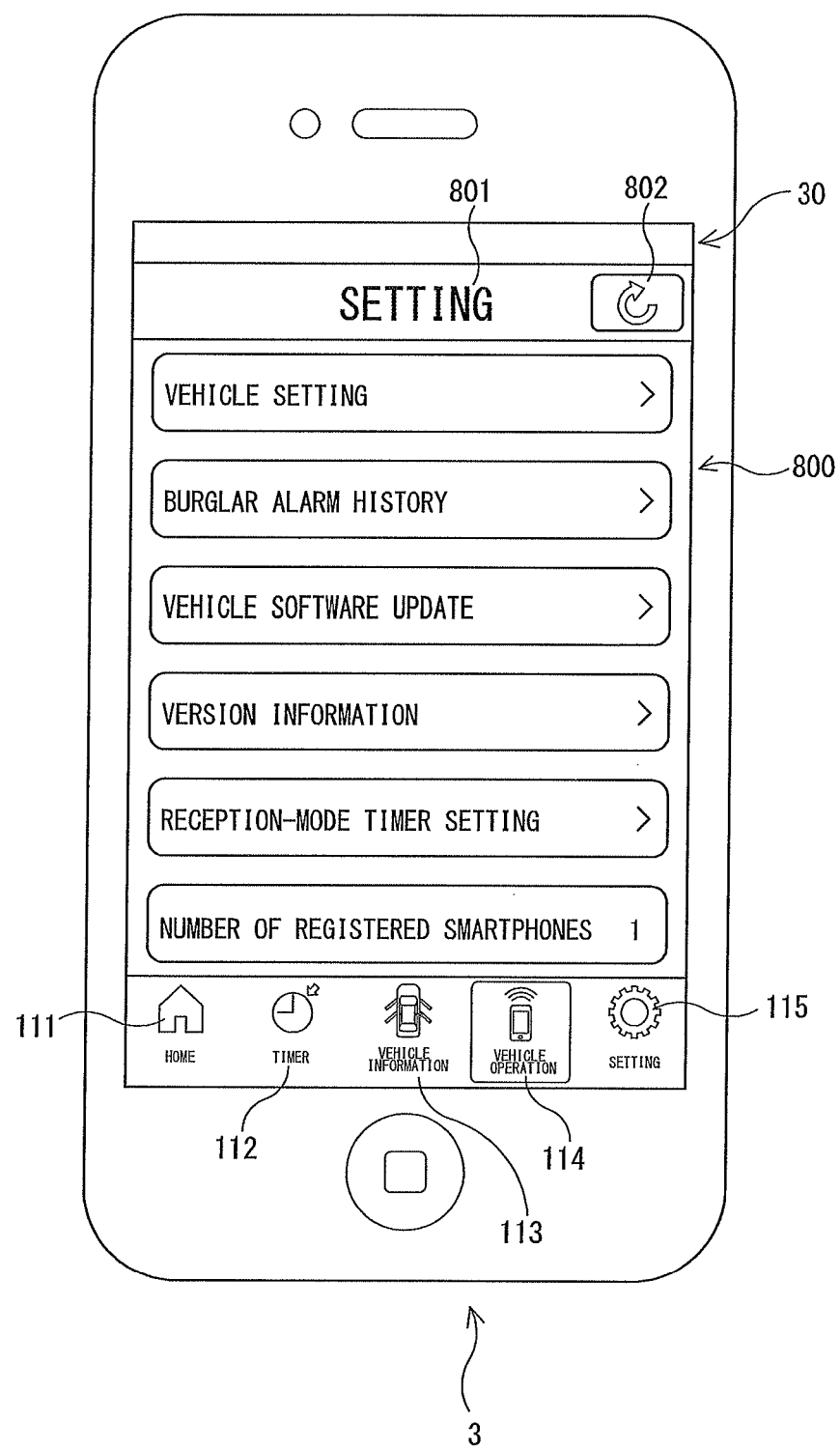
FIG. 12 illustrates a settings menu of a mobile communication device or a multifunctional portable terminal of a remote control system for in-vehicle devices according to an embodiment of the present invention.

The setting button 115 is touched to display a setting menu 800 illustrated in FIGS. 11 and 12. The top edge region of the setting menu 800 displays a menu title (setting) 801 and an update button (switch button) 802. Similar to the home menu 100, the bottom edge region displays various buttons (switch buttons), such as a home button 111, a timer button 112, a vehicle information button 113, a vehicle operation button 114, and a setting button 115.

The remaining center area of the setting menu 800 other than the top edge and the bottom edge regions displays setting items. The setting items include, for example, automatic passcode entry, passcode change, SSID change, ANY connection, vehicle number deregistration, vehicle settings, history of burglar alarm activation, update of vehicle software. References include the version information and the number of registered smartphones. FIG. 12 illustrates the setting menu 800 scrolled down from that illustrated in FIG. 11.

For example, a unique Wi-Fi device such as the smartphone 3 to be used for the remote control of the vehicle must be registered to the communication ECU 4 of the vehicle. In such a case, the communication ECU 4 of the vehicle is put into registerable state, the vehicle setting item in the menu is touched to enter a vehicle setting mode, the Wi-Fi device is connected to the vehicle, and the Wi-Fi password input to the Wi-Fi device is sent to the communication ECU 4. In this way, the Wi-Fi device is registered to the communication ECU 4 of the vehicle, and communication is available by launching a smartphone application.

The software of the communication ECU 4 of the vehicle can be updated by the smartphone 3 via Wi-Fi communication by touching a vehicle software update button in the menu. If the update of the software of the vehicle is required for normal operation of the functions, a warning menu for the software update is displayed on the smartphone.

[Mode-Switch Timing Control]

The communication ECU 4 of the remote control system is not constantly in a reception standby mode for signals from the smartphone 3. Instead, the communication ECU 4 enters a reception standby mode only within a time period in a time schedule set in advance and is in a reception dormant mode during other times, to suppress the consumption of the batteries 11A or 11B by a reception current in the reception standby mode.

That is, the communication ECU 4 of the vehicle has a switch to connect/disconnect a current from the +B terminal 43. The communication ECU 4 connects with the +B terminal 43 only within a specific time period in a set time schedule and disconnects with the +B terminal 43 at other times. The switching is achieved via a softswitch that is controllable by software. The time schedule can be set via the smartphone 3.

As illustrated in FIG. 1, the communication ECU 4 of the remote control system includes a softswitch or reception-mode switching unit 40A, a memory or mode-switch timing storage unit 40B, and a transmission unit or communication-state transmission unit 40C. The reception-mode switching unit 40A switches between a reception standby mode and a reception dormant mode. In the reception standby mode, the communication ECU 4 waits for the transmission of the smartphone 3 and consumes a standby current. In the reception dormant mode, the communication ECU 4 does not consume a standby current. The mode-switch timing storage unit 40B stores the time schedule for the reception standby mode and the reception dormant mode. The communication-state transmission unit 40C transmits information on the activation of the communication after the communication ECU 4 enters the reception standby mode to the smartphone 3.

The smartphone 3 of the remote control system includes a mode-switch timing setting unit 31, a mode-switch timing displaying unit 32, and a communication-state indicating unit 33. The mode-switch timing setting unit 31 sets a time schedule for the reception standby mode or the reception dormant mode of the communication ECU 4. The mode-switch timing displaying unit 32 displays the time schedule set by the mode-switch timing setting unit 31. The communication-state indicating unit 33 indicates the activation of the communication after the communication ECU 4 enters the reception standby mode.

The mode-switch timing setting unit 31 is operated via a touch panel 30B of the touch panel display 30 of the smartphone 3. The mode-switch timing displaying unit 32 and the communication-state indicating unit 33 are operated via a display 30A of the touch panel display 30 of the smartphone 3. The time schedule for the reception standby mode or the reception dormant mode is set by operation of the setting menu 800 on the smartphone 3, which is illustrated in FIGS. 11 and 12. The reception-mode timer button is selected from the setting menu. In response, a reception-mode-timer setting menu 900, such as that illustrated in FIG. 13A, is displayed.

Figure 13A:
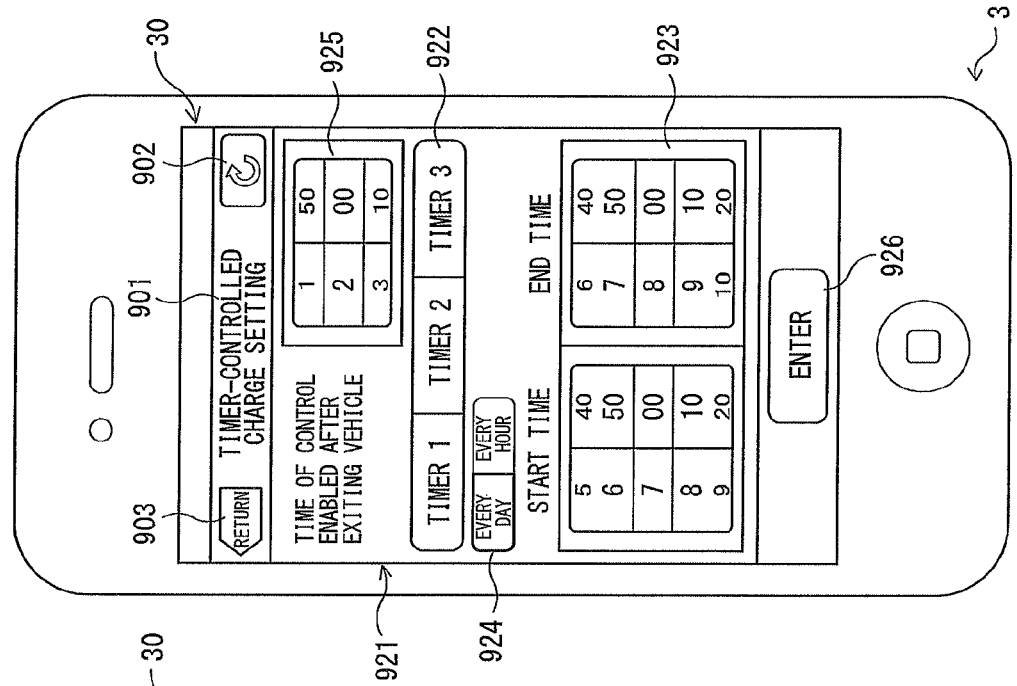
FIGS. 13A and 13B illustrate the settings for the timing control of the switching of communication modes in a wireless communication device installed in a vehicle of a remote control system for in-vehicle devices according to an embodiment of the present invention.

As illustrated in FIG. 13A, the top edge region of the reception-mode-timer setting menu 900 displays a menu title (reception-mode timer setting) 901, an update button (switch button) 902, and a return button (switch button) 903. The bottom edge region displays a timer setting button 911 and a send button 912.

The remaining center area of the reception-mode-timer setting menu 900 other than the top edge and the bottom edge regions displays a time schedule set regarding the timing of the reception standby mode. The following four setting patterns (1) to (4) for the reception standby mode and the current state (5) are provided for the requested establishment of communication between the smartphone 3 and the vehicle 1 by the operator, such as the driver, of the vehicle 1.

(1) Time of control enabled after exiting vehicle: X hours;
(2) Time 1 of control enabled: X1 to X2 every day;
(3) Time 2 of remote control enabled: X3 to X4 every day;

(4) Time 3 of remote control enabled: Y1 to Y2 every hour; and (5) Current remote control: activated/deactivated.

Figure 13B:
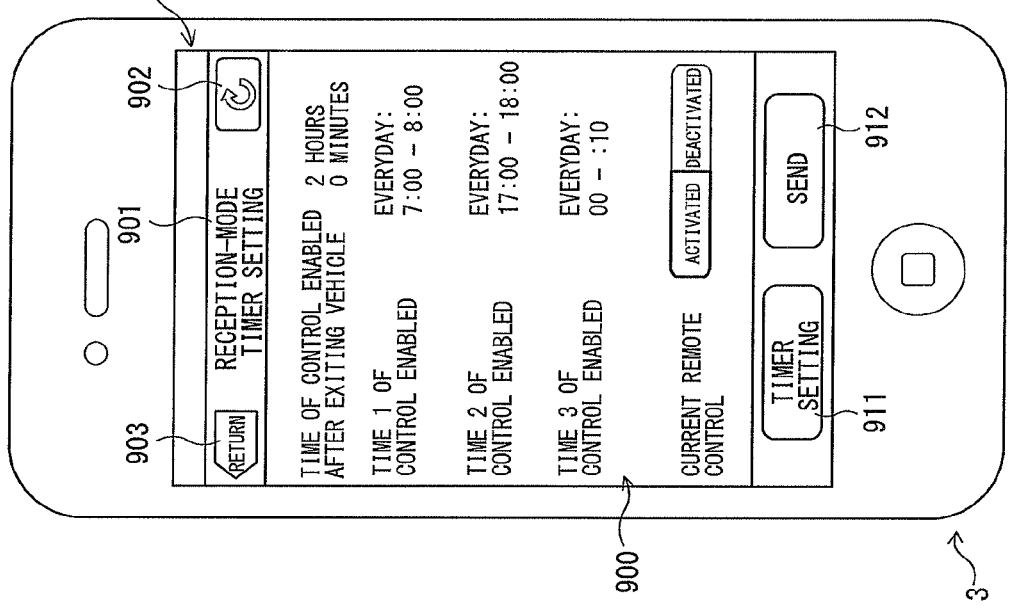

The time of the control enabled after exiting vehicle (1) is provided under the assumption that the operator of the vehicle frequently establishes communication with the vehicle 1 immediately after turning off the power switch 17 upon exiting the vehicle. The time of control enabled after exiting vehicle is set by touching a timer setting button 911 and displaying a timer setting menu 921 as illustrated in FIG. 13B. The timer setting menu 921 displays a scroll menu 925 of hour and minute for setting the time of control enabled after exiting vehicle. The time can be set by the operation of the scroll menu of hour and minute.

The times 1 to 3 of control enabled ((2) to (4)) refer to the time periods during which the control is enabled. The time periods can be set by touching the timer setting button 911 and displaying the timer setting menu 921 as illustrated in FIG. 13B. The timer setting menu 921 displays selection switch buttons 922 of the timers 1, 2, and 3 corresponding to the times 1, 2, and 3 of control enabled, respectively, a selection switch button 924 for selecting "everyday" and "every hour," and a scroll menu 923 for selecting the start time (hour and minute) and the end time (hour and minute).

One of the timers 1, 2, and 3 is selected. Then, one of "every day" and "every hour" is selected, and then, the hour and the minute of the start time and the end time are set on the scroll menu. If "every hour" is selected, the "hour" column of the scroll menu 923 for the start time (hour and minute) and the end time (hour and minute) is fixed to zero and only the "minute" column is scrollable.

The setting "every day" may be selected when the vehicle is used during a predetermined time period, for example, for commuting. The communication between the smartphone 3 and the vehicle 1 is often requested immediately before this predetermined time period. Thus, it is convenient if time of control enabled is set to the predetermined time period for "every day". The setting "every hour" is selected to ensure communication with the vehicle 1 during time periods other than those set for "every day".

The time 1 of the times 1, 2, and 3 of control enabled in FIG. 13A corresponds to the time period immediately before the use of the vehicle for outward commuting. The time 2 of control enabled corresponds to the time period immediately before the use of the vehicle for homeward commuting. The time 3 of control enabled is an example of the time period set for "every hour".

After setting the time schedule regarding the timing of the reception standby in this way, an enter button 926 displayed in the lower part of the timer setting menu 921 is touched to set the timer and then return to the reception-mode-timer setting menu 900 illustrated in FIG. 13A. The send button 912 is touched to send the information on the time schedule indicating the timing of the reception standby to the communication ECU 4 of the vehicle.

The time schedule is stored in the mode-switch timing storage unit 40B of the communication ECU 4 of the vehicle. Then, the reception-mode switching unit 40A switches between the reception standby mode and the reception dormant mode in accordance with the time schedule with reference to an internal timer. Upon the communication ECU 4 entering the reception standby mode to activate the communication, the communication-state transmission unit 40C sends communication-state information on the activation of communication to the smartphone 3. Immediately before the communication ECU 4 switches to a reception dormant mode to deactivate the communication, the communication-state transmission unit 40C sends information on the deactivation of the communication to the smartphone 3.

The information (activated/deactivated) on the current remote control (5) on the reception-mode-timer setting menu 900 is displayed on the basis of the information from the communication-state transmission unit 40C on the switching to the reception standby mode or the reception dormant mode.

In the remote control system, if the cumulative time of control enabled after exiting the vehicle (or after turning off the power switch 17) reaches a predetermined time (for example, 10 hours), the communication ECU 4 cancels the scheduled activation of control set by the reception mode timer. In this way, even if the vehicle is not operated for a long time, the consumption of the batteries 11A or 11B due to undesirable reception current can be suppressed.

If the cumulative time of control enabled reaches a predetermined time and the setting for the time of control enabled is canceled by the communication ECU 4, information on such cancellation is displayed on the smartphone 3 by launching an application of the remote control system on the smartphone 3. That is, the smartphone 3 acquires information from the communication-state transmission unit 40C on the switching to the reception standby mode or the reception dormant mode, and because of such information, the smartphone 3 is able to calculate the cumulative time of control enabled, detect the cancellation of the setting for the time of control enabled on the basis of the calculated cumulative time, and display such cancellation caused when the cumulative time reaches the predetermined time on the basis of the detection.

OPERATION AND ADVANTAGES

The remote control system for in-vehicle devices according to an embodiment of the present invention has the configuration described above and achieves the following operation and advantages.

By using wide-spread smartphones 3, various in-vehicle devices installed in the vehicle can be operated, monitored, and/or controlled at a point away from the vehicle by remote control. For example, the charge of the main battery 11A and the auxiliary battery 11B can be started or stopped by remote control. The start/stop of the charge can be carried out in accordance with a predetermined schedule. Thus, the charge can be readily controlled in the vehicle used at a regular timing.

The charged state of the main battery 11A appears on the display 30 of the smartphone 3 on the basis of the information sent from the in-vehicle charger ECU 22. Thus, especially, the charged state (state of charge) of the main battery 11A which is preferably grasped can be readily confirmed.

The air-conditioner 12 can be started by remote control through the smartphone 3 at a point away from the vehicle. Thus, the interior of the vehicle can be comfortably air-conditioned before an operator enters the vehicle. The air-conditioner 12 can be started in accordance with a start-up timing on a schedule set in advance. Thus, the operation of the air-conditioner 12 can be readily controlled in the vehicle that is used regularly.

The operating state of the air-conditioner 12 in accordance with an operation signal can be displayed on the display 30 of the smartphone 3. Thus, the state of the air-conditioning of the vehicle can be readily confirmed.

The communication between the smartphone 3 and the communication ECU 4 of the vehicle is established via the Wi-Fi scheme. The Wi-Fi communication has a relatively high communication rate, has a relatively large wireless communication distance, and has a low running cost due to its high versatility that does not require a communication infrastructure. Thus, a Wi-Fi device, such as the smartphone 3, can be comfortably used for remote control of in-vehicle devices at a suppressed cost, at a stress-free rate, and over a relatively long wireless communication distance (for example, approximately 200 m). Also, the running cost can be suppressed low.

In the Wi-Fi communication, the state of charge of the in-vehicle battery may decrease rapidly due to an increase in a standby current. In this remote control system, however, the communication ECU 4 of the vehicle is not constantly in the reception standby mode for signals from the smartphone 3. Instead, the communication ECU 4 enters the reception standby mode only within time periods on the time schedule set in advance and remains in the reception dormant mode during other times. In this way, the consumption of the battery 11A or 11B due to a reception current in the reception standby mode can be suppressed.

The time schedule for the reception standby mode of the communication ECU 4 can be freely set by the operator of the vehicle, such as the driver, with the smartphone 3. Thus, the consumption of the batteries 11A or 11B can be suppressed without the inconvenience due to the reception dormant mode.

The time schedule of the set reception standby (i.e., available communication) is displayed. Thus, necessary remote control of the in-vehicle devices can be positively performed with reference to the time schedule of the reception standby.

The communication ECU 4 sends the information on whether actually being in the reception standby mode or not, and the activation/deactivation of communication is displayed on the basis of this information. Thus, the communication available/unavailable at the moment can be correctly displayed. By confirming this display, incorrect operations, such as attempting to communicate with a device in the reception dormant mode, can be prevented.

Especially, in this embodiment, the time schedule of the reception standby mode can be readily set by displaying the timer setting menu 921 and setting the time of control enabled after exiting the vehicle and/or the times 1 to 3 of control enabled for every day or every hour. This enhances the convenience of the remote control system.

If it puts in another way, the remote control system for in-vehicle devices can enter a reception standby mode only within predetermined time periods by setting a time schedule for the reception standby mode, reduce power consumption due to the standby current of the wireless communication device 4 in the vehicle, and suppress a decrease in a state of charge of an in-vehicle battery. During predetermined time periods, the in-vehicle devices can be readily operated by remote control since the system enters the reception standby mode.

The wireless LAN communication established between the mobile communication device 3 and the wireless communication device 4 enhances the convenience through an increased communication rate. In contrast, the state of charge of the in-vehicle battery may decrease rapidly due to an increase in the standby current. A decrease in the state of charge of the in-vehicle battery is suppressed by entering the reception standby mode only during predetermined time periods.

The mobile communication device 3 establishes the time schedule for the reception standby mode or the reception dormant mode and sends this time schedule to the wireless communication device 4, and subsequently entering the mode-switch timing storage unit 40B to readily establish the time schedule for the reception modes. Displaying the time schedule established by the mode-switch timing setting unit 31 allows easy confirmation of the time schedule.

The indication on the mobile communication device 3 about the activation of communication after the wireless communication device 4 enters the reception standby mode enables the immediate detection of the activation of the communication, and a signal may be transmitted to the wireless communication device 4 at this timing.

The transmission of the communication-state information from the wireless communication device 4 in the reception standby mode to the mobile communication device 3 and the indication of the activation of communication by the mobile communication device 3 upon the reception of the communication-state information can indicate the activation of communication without error.

[Others]

The present invention should not be limited to the embodiments described above and the embodiments may be appropriately modified within the scope of the invention.

For example, a current discharged after the batteries 11A and 11B are fully charged may be detected to determine the discharge of the batteries 11A and 11B on the basis of the integration of the detected current, and then the states of charges of the batteries 11A and 11B may be estimated. If the states of charges of the batteries 11A and 11B fall below a predetermined level, the Wi-Fi connection may be disconnected to prevent the batteries from running out. In such a case, it is preferred that the information on the disconnection be displayed on the mobile communication device, such as a smartphone.

In the embodiments described above, a mobile communication device is exemplified by a multifunctional mobile phone called a smartphone. The mobile communication device is not limited to the above exemplification.

For example, a tablet terminal (tablet PC), which is widely used today, may as well be employed as the mobile communication device supporting the Wi-Fi scheme.

In the embodiments described above, the Wi-Fi scheme is employed as a wireless LAN scheme. The usable communication standard is not limited to those described above, and any other wireless LAN scheme or a wireless scheme may be employed. The communication standard is preferred to have a relatively high communication rate, a relatively large wireless communication distance, and a low running cost due to its high versatility that does not require a communication infrastructure, such as the Wi-Fi scheme.

A Communication standard having such characteristics, such as the Wi-Fi scheme, may enhance the standby current of the wireless communication device installed in the vehicle. In such a case, it is effective to suppress the battery consumption in the vehicle by a reception standby mode only during a predetermined time period as in the present invention.

INDUSTRIAL APPLICABILITY

The present invention is advantageous for remote control of an in-vehicle device installed in an automobile and detection and control of the state of the in-vehicle device, and, in particular, for suppressing consumption of a battery in the vehicle in case of using a communication standard, such as the Wi-Fi scheme, that requires a large reception standby current.

The invention claimed is:

1. A remote control system for in-vehicle devices, comprising:
an in-vehicle-device controller installed in a vehicle and controlling an in-vehicle device installed in the vehicle;

a mobile communication device that remotely controls the in-vehicle device via the in-vehicle-device controller; and a wireless communication device installed in the vehicle and intervening and establishing wireless communication between the in-vehicle-device controller and the mobile communication device, the wireless communication device including:

a reception-mode switching unit switching between a reception standby mode in which the mobile communication device is allowed to wirelessly communicate with the wireless communication device with consumption of a standby current preparing for reception from the mobile communication device and a reception dormant mode in which the wireless communication device is turned off to completely prohibit the mobile communication device from wirelessly communicating with the wireless communication device to suppress consumption of the standby current; and a mode-switch timing storage unit storing a time schedule transmitted for the reception standby mode or the reception dormant mode, wherein the reception-mode switching unit switches between the reception standby mode and the reception dormant mode in accordance with the time schedule stored in the mode-switch timing storage unit, such that the reception dormant mode is maintained until the wireless communication device is switched to the reception standby mode in accordance with the stored time schedule, and wherein the mobile communication device includes, a mode-switch timing setting unit configured to set a time schedule for the reception standby mode or the reception dormant mode, and wherein the time schedule set by the mode-switch timing setting unit is transmitted to the wireless communication device and stored in the mode-switch timing storage unit.

2. The remote control system for in-vehicle devices according to claim 1, wherein the communication between the mobile communication device and the wireless communication device is wireless LAN communication.

3. The remote control system for in-vehicle devices according to claim 1, wherein the mobile communication device includes, a mode-switch timing displaying unit displaying the time schedule set by the mode-switch timing setting unit.

4. The remote control system for in-vehicle devices according to claim 3, wherein the mobile communication device includes a communication-state indicating unit indicating the activation of communication after the wireless communication device enters the reception standby mode.

5. The remote control system for in-vehicle devices according to claim 4, wherein the wireless communication device includes a communication-state transmission unit transmitting communication-state information on the activation of communication to the mobile communication device during the reception standby mode, and the communication-state indicating unit of the mobile communication device indicates the activation of communication upon the reception of the communication-state information.

6. The remote control system for in-vehicle devices according to claim 2, wherein the mobile communication device includes:

a mode-switch timing displaying unit displaying the time schedule set by the mode-switch timing setting unit.

7. The remote control system for in-vehicle devices according to claim 6, wherein the mobile communication device includes a communication-state indicating unit indicating the activation of communication after the wireless communication device enters the reception standby mode.

8. The remote control system for in-vehicle devices according to claim 7, wherein the wireless communication device includes a communication-state transmission unit transmitting communication-state information on the activation of communication to the mobile communication device during the reception standby mode, and the communication-state indicating unit of the mobile communication device indicates the activation of communication upon the reception of the communication-state information.

* * * * *